United States Patent [19]
Guenther et al.

[11] Patent Number: 5,964,140
[45] Date of Patent: Oct. 12, 1999

[54] TANDEM MASTER CYLINDER PISTON PROTECTION WITH CENTERING GUIDE

[75] Inventors: Stefan Guenther, Orion; Peter Alchamli, Rochester, both of Mich.

[73] Assignee: ITT Manufacturing Enterprises, Inc., Wilmington, Del.

[21] Appl. No.: 08/920,028

[22] Filed: Aug. 26, 1997

[51] Int. Cl.⁶ .................................................. F01B 29/00
[52] U.S. Cl. .............................................. 92/128; 60/533
[58] Field of Search .......................... 92/128, 129, 168; 60/533, 547.1

[56] References Cited

U.S. PATENT DOCUMENTS

| | | |
|---|---|---|
| 3,002,499 | 10/1961 | Schultz . |
| 3,786,903 | 1/1974 | Haga et al. ............................ 60/547.1 |
| 4,307,570 | 12/1981 | Yardley . |
| 4,608,826 | 9/1986 | Sawyer . |
| 4,831,916 | 5/1989 | Leigh-Monstevens et al. .......... 92/129 |
| 4,884,494 | 12/1989 | Campbell et al. ....................... 60/533 |
| 4,909,131 | 3/1990 | Nix et al. ............................... 92/169.1 |
| 5,233,833 | 8/1993 | Last, Jr. et al. . |

FOREIGN PATENT DOCUMENTS

| | | |
|---|---|---|
| 56-90767 | 7/1981 | Japan . |
| 58-39555 | 3/1983 | Japan . |

OTHER PUBLICATIONS

Drawing of ITT GS Design dated Jul. 4, 1996.

*Primary Examiner*—Thomas E. Denion
*Attorney, Agent, or Firm*—Rader, Fishman & Grauer PLLC

[57] ABSTRACT

A master cylinder for attachment with a pre-installed brake booster includes a housing having a bore to receive a piston and piston rod. An outermost end of the piston rod has a guide member in the shape of a funnel which centrally aligns a push rod in the brake booster with a blind bore in the piston rod during attachment with the booster. In addition, a sealing boot is provided on the master cylinder to protect the piston rod outer sealing surface from foreign material and foreign objects that would otherwise contact the piston rod surface during shipping, storage, and installation. The sealing boot is attached at one end to the housing and at an opposite end to the guide member.

15 Claims, 3 Drawing Sheets

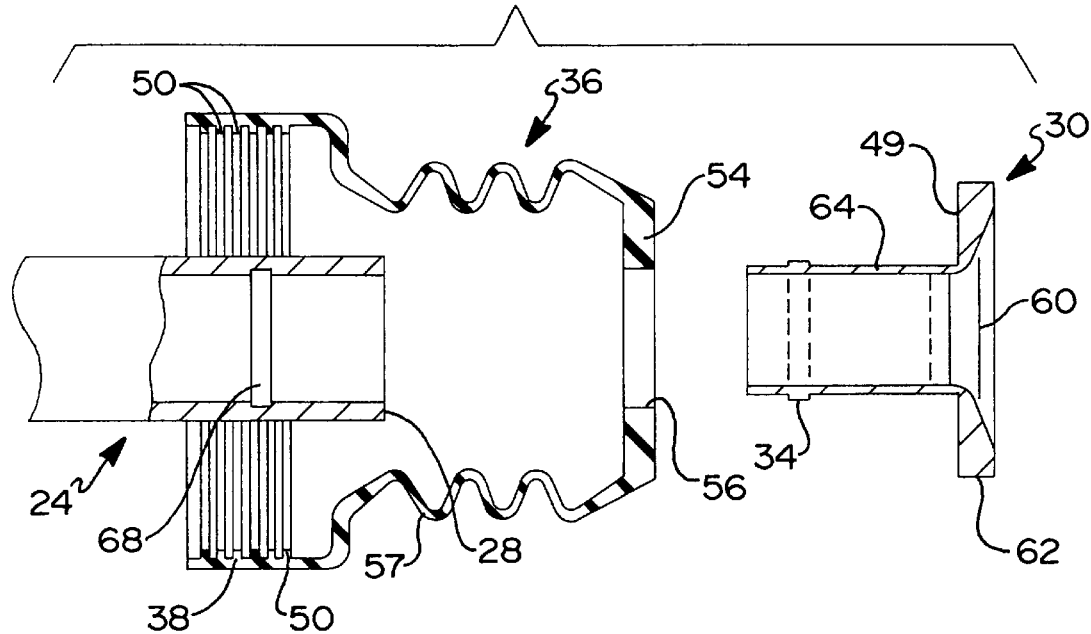
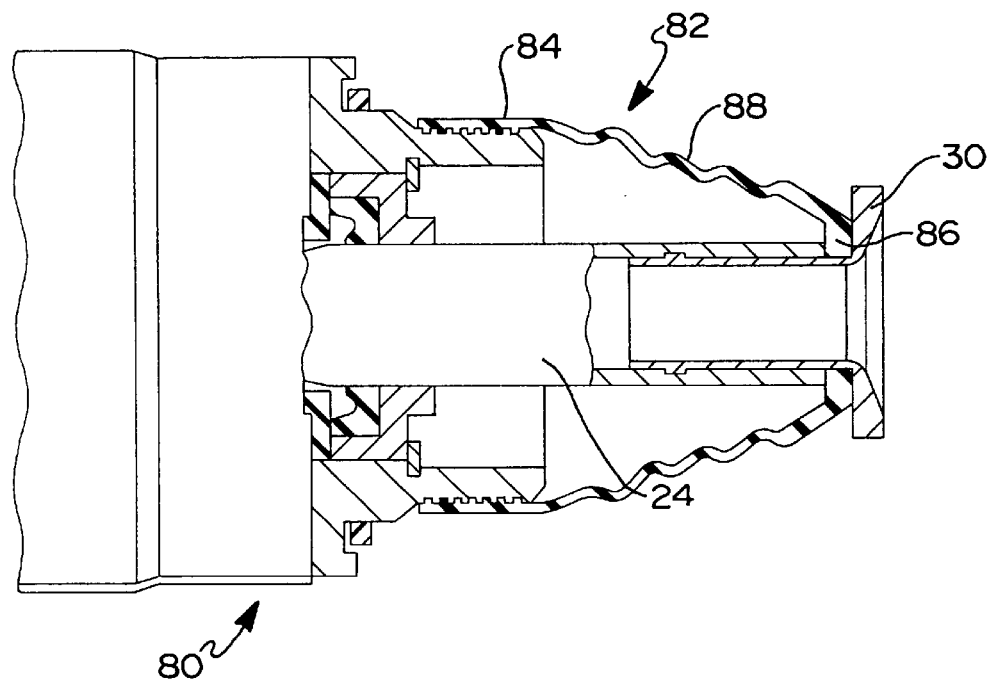

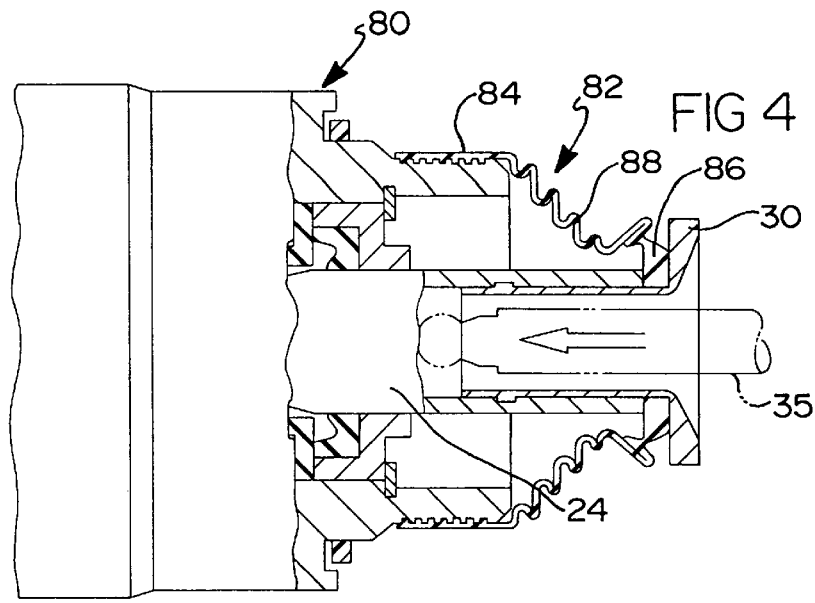
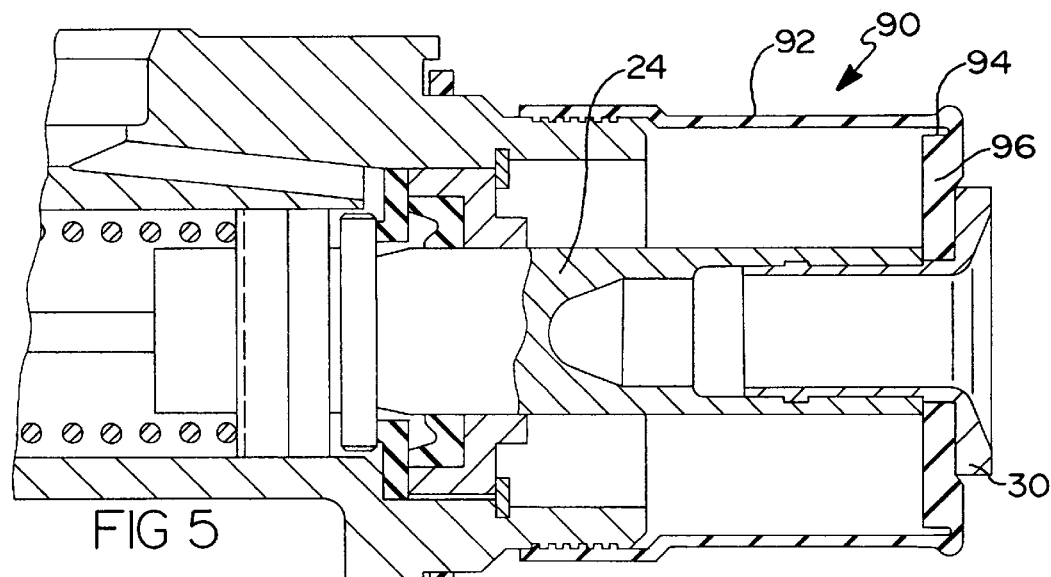
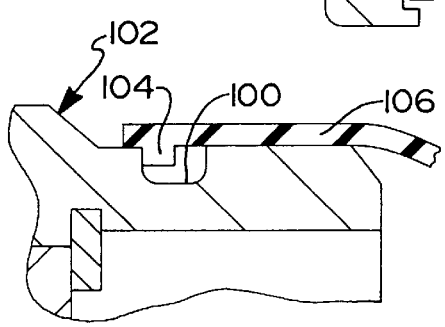
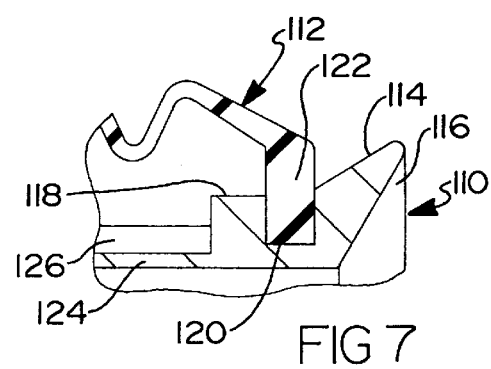

TANDEM MASTER CYLINDER PISTON PROTECTION WITH CENTERING GUIDE

FIELD OF THE INVENTION

The present invention relates to a master cylinder, and more particularly to a tandem master cylinder having a boot for protecting a piston rod sealing surface and a centering guide to aid in assembling a push rod into the piston rod.

BACKGROUND OF THE INVENTION

Brake master cylinders are well known in the brake art for converting a mechanical force that is input from a brake pedal into a fluid pressure acting on a brake actuator at a vehicle wheel to effect vehicle braking. Power assisted brakes have a power booster attached to the master cylinder to reduce the amount of brake pedal input force required from a driver.

One method for supplying master cylinders involves a brake component supplier assembling a master cylinder to a power booster and then shipping the completed subassembly to a vehicle manufacturer's plant for final assembly into a vehicle.

A second method involves separately supplying a master cylinder to a vehicle manufacturer's plant because a power booster has already been installed into a vehicle. In contrast with the first method, the master cylinder is assembled into the power booster at the vehicle manufacturer's plant, rather than the supplier's plant. As a result, a portion of the master cylinder which extends into the power booster is now exposed to foreign material and foreign objects during shipping from the brake component supplier and during storage, retrieval and installation at the vehicle manufacturer's plant prior to assembly within a booster. Part of the exposed portion includes a reciprocating member having an outer surface which engages a seal. Damage to the outer surface by foreign material or foreign objects can result in seal failure and loss of master cylinder fluid which could ultimately result in brake failure.

Attempts have been made to ease assembly and protect the exposed reciprocating member of master cylinders during shipment and later during assembly at the vehicle manufacturer's plant. A known design includes a single seal having two diameter sections separated by a shoulder. One end of the seal is attached to a front face of a master cylinder housing for sealing the interface between the housing and a brake booster. The other end of the seal is attached to a piston and aids in aligning the piston with a push rod in the booster. Another known design includes a funnel shaped centering guide attached to the end of a piston rod and also has a protective sleeve with one end sealingly attached to the housing and the other end being open. In this design, the protective sleeve is a rigid component.

The previous attempts at protecting a reciprocating member of a master cylinder have not been completely effective. The first mentioned design attempts to provide a seal that aids in aligning the piston to a push rod, protects the piston surface, and also seals the housing to booster interface. Such a seal design is not desirable since it does not allow for easy assembly of the push rod to the piston and it includes a larger diameter seal portion which is more susceptible to contact with a booster opening and therefore, more susceptible to damage. The other design does not effectively seal out foreign material or objects. The open end of the sleeve allows debris and tools to reach a sealing surface on the piston rod leading to greater chances of seal failure.

SUMMARY OF THE INVENTION

The present invention is directed to a brake master cylinder having a housing, a piston located in the housing and connected to a piston rod, a protective boot which sealingly engages a generally cylindrical extension of the housing and sealingly engages a guide member attached to the end of the piston rod. The boot protects the outer surface of the piston rod from damage by foreign material and foreign objects. The piston rod outer surface must not be damaged because the outer surface is designed to slide past a seal as it reciprocates within the housing. If the outer surface is damaged, the seal can become damaged, resulting in loss of master cylinder fluid and eventually loss of braking. The guide member on the piston rod is preferably in the shape of a funnel and provides a centering function by centering a push rod relative to the piston rod during assembly of the master cylinder to a brake booster.

The present invention avoids the drawbacks of the known devices by providing a boot which effectively protects the sealing surface on the piston rod from foreign material. Moreover, the boot reduces the likelihood of damage which can occur during shipping and during assembly of the master cylinder to a brake booster.

In addition, the present invention provides a guide member on the outer end of the piston rod for performing two functions. First, the guide member provides a mounting surface for one end of the boot to sealingly engage the guide member. Second, the guide member improves assembly by providing a funnel shaped opening which centers the push rod relative to an internal bore in the piston rod.

Therefore, the present invention provides improved protection of a sealing surface while also providing greater ease in assembling a master cylinder to a previously installed brake booster.

BRIEF DESCRIPTION OF THE DRAWINGS

The features and inventive aspects of the present invention will become more apparent upon reading the following detailed description, claims, and drawings, of which the following is a brief description:

FIG. 2 is an exploded cross-sectional view of a protective boot and guide member according to the present invention.

FIG. 3 is a cross-sectional side view of the present invention having a tapered sealing boot in an extended position.

FIG. 4 is a cross-sectional side view of the present invention in a retracted position.

FIG. 5 is a side view of an alternate embodiment according to the present invention.

FIG. 6 shows an alternate attachment technique for a protective boot to a master cylinder.

FIG. 7 shows an alternate attachment technique for a protective boot to a guide member.

DETAILED DESCRIPTION OF PREFERRED EMBODIMENTS

Figure 1:
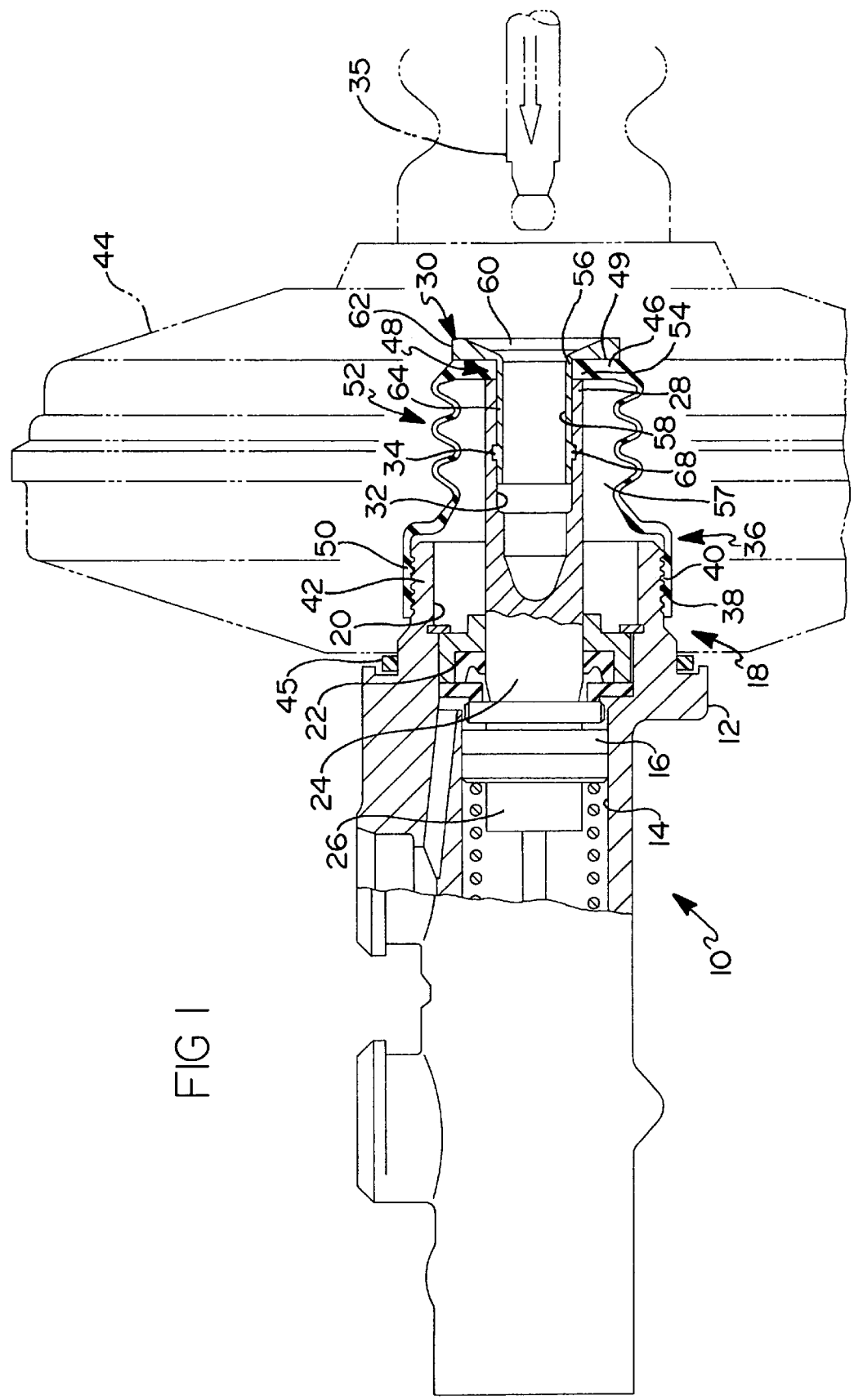
FIG. 1 is a partial cross-sectional view of a brake master cylinder according to the present invention.

FIG. 1 shows a preferred embodiment of the present invention including a tandem master cylinder 10 having a housing 12 and a first internal bore 14. A piston 16 is slidingly mounted within bore 14 and reciprocates therein. Housing 12 includes a generally cylindrical extension 18 located at one end thereof. Extension 18 is located adjacent internal bore 14 and has a generally hollow cylindrical shape defining a second internal bore 20 which has a greater diameter than first bore 14. Second bore 20 receives a seal 22 which engages a piston rod 24. Piston rod 24 has an outer surface which contacts seal 22. Piston rod 24 further includes a first end 26 connected to piston 16 and a second end 28 connected to a guide member 30. Second piston rod end 28 has a blind bore 32 for receiving a projection 34 on guide member 30. Piston rod blind bore 32 also receives a push rod 35 (shown in phantom) which transmits force from a brake pedal (not shown) via a brake booster 44 (shown in phantom) to master cylinder 10.

In addition, a protective sealing boot 36 is provided to protect the outer surface of piston rod 24 from damage due to foreign material or contact with foreign objects such as tools. Boot 36 includes a first end portion 38 engaging circumferential grooves 40 located on the outer periphery of master cylinder housing extension 18. Preferably, grooves 40 are located on the smallest outer diameter portion 42 of extension 18 so that protective boot 36 has less likelihood of interference and damage during installation into brake booster 44. A seal 45 is provided to seal between master cylinder 10 and brake booster 44. A second end portion 46 of boot 36 sealingly engages a circumferential groove 48 defined between piston rod second end 28 and a back face 49 of guide member 30. More specifically, first end portion 38 has a shape of a cylinder and includes multiple radially inward ribs 50 that are received in grooves 40. A middle section 52 has multiple folds forming a bellows portion that can easily retract or extend to follow the reciprocating movement of piston rod 24. Second end portion 46 includes a radially inward projection 54 at its outermost end. Projection 54 defines an end opening 56 of boot 36 that accepts part of guide member 30, and is received in sealing engagement within groove 48. Boot 36 is preferably made of an elastomeric material to provide a light weight protective cover having increased seal life. With this construction, the present invention provides improved protection for piston rod 24 by sealing off both ends of protective boot 36. An opening 57 is provided in boot 36 to allow pressure relief as boot 36 extends and retracts.

Another feature of the present invention is the provision of guide member 30 to center push rod 35 during assembly of master cylinder 10 to brake booster 44. Guide member 30 has a thru bore 58 to receive push rod 35 and includes an end face 60 shaped and designed to center push rod 35 relative to piston rod bore 32. End face 60 preferably has the shape of a truncated cone, i.e. a funnel shape, to easily align mating components. The larger diameter of the cone initially receives push rod 35 and is located at the end of guide 30, furthest from piston rod bore 32. The tapering cone design acts to centrally align push rod 35 with thru bore 58 and piston rod bore 32. Although a truncated cone is shown in the preferred embodiment, other shapes having surfaces which perform a similar alignment function are contemplated to be used. For example, pyramidal shapes or triangular shapes are envisaged, but not meant to be exhaustive of contemplated shapes.

Guide member 30 includes a first section 62, closest to end face 60, having a generally cylindrical, disk shape. A second section 64 is connected to first section 62 and has a generally tubular shape, but is smaller in diameter than first section 62. In addition, second section 64 is slightly smaller in diameter than blind bore 32 allowing insertion of second section 64 into blind bore 32. Projection 34 is located along second section 64 and projects radially outward. Preferably, there are three projections 34 that are spaced equally around the circumference of second section 64 to provide an effective snap fit connection. Projection 34 is designed to snap fit into a groove 68 in blind bore 32 upon proper insertion of second section 64 into blind bore 32. Location of projection 34 relative to back face 49 and location of groove 68, combine to determine the size of circumferential groove 48. Other attachment techniques for guide member 30 are also contemplated, including, threaded attachment, welding, adhesives, or any other suitable attachment techniques.

FIG. 2 shows an exploded view of guide member 30, protective boot 36, and piston rod 24. As clearly illustrated, guide member projection 34 is designed so as to be received in groove 68 inside piston rod 24. Boot 36 includes multiple ribs 50 that engage in corresponding grooves 40 of master cylinder outer diameter portion 42. Ribs 50 increase retention of boot 36 by providing positive engagement.

FIG. 3 shows an alternate embodiment of the present invention including a portion of a tandem master cylinder 80 provided with a protective boot 82 having a tapered bellows design. Boot 82 has a first end portion 84 and a second end portion 86 that attach in similar manners as end portions 38, 46 of boot 36 in FIG. 1. However, boot 82 has a middle section 88 with bellows folds that taper in decreasing size from master cylinder housing (first end portion) 84 toward guide member (second end portion) 86. Such a tapered bellows improves assembly by having a reduced size near guide (second end portion) 86, reducing possible interference caused by boot 82 as it is installed within a brake booster (not shown). A tapered bellows can also retract to a smaller length than a constant diameter bellows because the tapering folds can telescope within each other, rather than stack up, one fold next to the other. Boot 82 is illustrated in its extended position, such as when the brakes are in a released, unactuated position.

In comparison, FIG. 4 shows tapered boot 82 in a retracted position, such as when the brakes are actuated. It can be seen that tapered boot 82 can continue retraction, if needed, by pushing smaller folds within larger folds in a telescoping manner.

FIG. 5 illustrates a further embodiment of the present invention having a generally cylindrical protective boot 90 that attaches using similar techniques as boots 36 and 82. However, instead of a bellows portion, boot 90 has a middle section 92 that is a hollow cylindrical member. An undercut 94 is provided near inward projection 96 to encourage folding over of the cylindrical member onto itself when boot 90 is retracted during brake actuation.

FIG. 6 shows an alternate method of attaching a protective boot to a master cylinder, and can be used with any of the previous embodiments. In this embodiment, a single groove 100 is provided on a master cylinder 102 to receive a single rib 104 projecting inwardly from a boot 106. Depending on the size of rib 104, assembly can be easier than multiple rib embodiments. However, some degree of retention is also forfeited.

FIG. 7 shows an alternate design for a guide member 110 and an alternate connection for a boot 112. This alternate embodiment can likewise be used with any of the previous embodiments. Guide member 110 has a funnel shaped design with three distinct sections on the outer surface. A first section 114, closest to guide member end face 116, has a generally conical or truncated cone shape. A second section 118, adjacent first section 114, has a generally cylindrical shape and includes a circumferential groove 120 located therein for receiving an inward projection 122 of boot 112. A third section 124 is connected to second section 118 and also has a generally cylindrical shape. However, third section 124 has a smaller outer diameter than second section 118, allowing insertion of third section 124 within piston rod 126. Groove 120 is located entirely on guide member 110, unlike the previous embodiments, in which the circumferential groove is defined between the end of the piston rod and the back face of the guide member.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A master cylinder for a brake system comprising:
   a housing having an internal bore and a generally cylindrical extension adjacent said internal bore;
   at least one piston reciprocatingly received in said bore;
   a piston rod connected to said piston, said piston rod having an internal bore for receiving a push rod which transmits force from a brake pedal;
   a guide member connected to said piston rod for aiding assembly of said piston rod to a push rod;
   a sealing boot having a first end which sealingly engages said guide member and a second end which sealingly engages said generally cylindrical extension of said housing, said sealing boot preventing foreign material and foreign objects from damaging an outer surface of said piston rod; and
   wherein said first end of said sealing boot is positioned between an end of said piston rod and a back face of said guide member.

2. The master cylinder of claim 1, wherein said guide member has a funnel shape.

3. The master cylinder of claim 1, wherein said generally cylindrical extension has at least one circumferential groove on its outer periphery for receiving at least one rib on said second end of said sealing boot.

4. The master cylinder of claim 3, wherein said at least one circumferential groove is a plurality of grooves and said at least one rib is a plurality of ribs.

5. The master cylinder of claim 1, wherein said guide member is positively connected to said inner bore of said piston rod.

6. The master cylinder of claim 5, wherein said guide member includes at least one locking projection to snap fit within said piston rod bore.

7. The master cylinder of claim 2, wherein said guide member further comprises a conical inner surface adjacent an inner bore and a conical outer surface adjacent a first cylindrical outer surface having a groove for receiving said sealing boot and a second cylindrical outer surface having a projection for fastening said guide member within said inner bore of said piston rod.

8. The master cylinder of claim 1, wherein said sealing boot includes a bellows portion adjacent said first end.

9. The master cylinder of claim 8, wherein said bellows portion tapers from said housing toward said guide member.

10. The master cylinder of claim 1, wherein said guide member has a circumferential groove for receiving said first end of said sealing boot.

11. A master cylinder for a brake system comprising:
    a housing having an internal bore and a generally cylindrical extension adjacent said internal bore;
    at least one piston reciprocatingly received in said bore;
    a piston rod connected to said piston, said piston rod having an internal bore for receiving a push rod which transmits force from a brake pedal;
    a guide member connected to said piston rod for aiding assembly of said piston rod to a push rod, wherein said guide member includes at least one locking projection to snap fit within said piston rod bore; and
    a sealing boot having a first end which sealingly engages said guide member and a second end which sealingly engages said generally cylindrical extension of said housing, said sealing boot preventing foreign material and foreign objects from damaging an outer surface of said piston rod.

12. A master cylinder for a brake system comprising:
    a housing having an internal bore and a generally cylindrical extension adjacent said internal bore;
    at least one piston reciprocatingly received in said bore;
    a piston rod connected to said piston, said piston rod having an internal bore for receiving a push rod which transmits force from a brake pedal;
    a guide member having a through bore and a relatively smaller diameter first section for attaching to said piston rod and a relatively larger diameter second section that includes a funnel shaped end face for engaging and aligning a push rod as it is inserted into said through bore and said internal bore of said piston rod; and
    a sealing boot having a first end which sealingly engages said guide member and a second end which sealingly engages said generally cylindrical extension of said housing, said sealing boot preventing foreign material and foreign objects from damaging an outer surface of said piston rod.

13. The master cylinder of claim 12, wherein said first section of said guide member is positioned in said inner bore of said piston rod.

14. The master cylinder of claim 12, wherein said second section of said guide member has a circumferential groove for receiving said first end of said sealing boot.

15. The master cylinder of claim 12, wherein said first end of said sealing boot is positioned between and end of said piston rod and a back face of said guide member.

* * * * *